United States Patent
Rondeau et al.

(10) Patent No.: US 8,172,823 B2
(45) Date of Patent: May 8, 2012

(54) PORT ASSEMBLY FOR USE WITH NEEDLELESS CONNECTOR

(75) Inventors: Georges Rondeau, Braffe (BE); Gianni Di Stefani, Ath (BE); Eric J. Henaut, Arquennes (BE); Steven C. Jepson, Palatine, IL (US); Mark C. Perry, McHenry, IL (US); James B. Winje, Franklin Park, IL (US); Richard F. Chamernik, Beach Park, IL (US)

(73) Assignees: Baxter International Inc., Deerfield, IL (US); Baxter Healthcare S.A., Glattpark (Opfikon) (CH)

( * ) Notice: Subject to any disclaimer, the term of this patent is extended or adjusted under 35 U.S.C. 154(b) by 499 days.

(21) Appl. No.: 12/167,398

(22) Filed: Jul. 3, 2008

(65) Prior Publication Data
US 2010/0004619 A1    Jan. 7, 2010

(51) Int. Cl.
*A61B 19/00*    (2006.01)
*A61M 5/32*    (2006.01)
*F16K 51/00*    (2006.01)

(52) U.S. Cl. ........ 604/407; 604/411; 604/415; 604/416; 251/142

(58) Field of Classification Search .................. 604/403, 604/408, 411, 412, 414, 415, 416
See application file for complete search history.

(56) References Cited

U.S. PATENT DOCUMENTS

| | | |
|---|---|---|
| 3,368,560 A | 2/1968 | Gewecke |
| 3,509,879 A | 5/1970 | Bathish et al. |
| 3,915,212 A | 10/1975 | Bujan et al. |
| 3,977,555 A * | 8/1976 | Larson ........................... 215/247 |
| 4,181,140 A | 1/1980 | Bayham et al. |
| 4,187,893 A | 2/1980 | Bujan |
| 4,270,534 A | 6/1981 | Adams |
| 4,294,247 A | 10/1981 | Carter et al. |
| 4,340,049 A | 7/1982 | Munsch |
| 4,386,622 A | 6/1983 | Munsch |

(Continued)

FOREIGN PATENT DOCUMENTS

DE    29800107    3/1998

(Continued)

OTHER PUBLICATIONS

International Search Report and Written Opinion for corresponding International Application No. PCT/US09/45273, 11 pages (Sep. 2, 2009).

(Continued)

*Primary Examiner* — Leslie Deak
*Assistant Examiner* — Adam Marcetich
(74) *Attorney, Agent, or Firm* — Marshall, Gerstein & Borun LLP

(57) ABSTRACT

A port assembly includes a valve housing with an inlet opening, a valve disposed in the valve housing to control access through the inlet opening, and a base joined to the valve housing and having a bore therethrough. The bore has a closed end defined by a frangible barrier, and a pushrod is disposed in the bore between the valve and the frangible barrier, axial movement of the pushrod causing rupture of the frangible barrier. The port assembly may be used in a fluid container that includes a receptacle for retaining a fluid, and at least one conduit in communication with the receptacle. The at least one conduit is defined, at least in part, by a port assembly.

29 Claims, 11 Drawing Sheets

U.S. PATENT DOCUMENTS

| | | | |
|---|---|---|---|
| 4,410,321 A | 10/1983 | Pearson et al. |
| 4,411,662 A | 10/1983 | Pearson |
| 4,432,755 A | 2/1984 | Pearson |
| 4,435,179 A | 3/1984 | Walker et al. |
| 4,458,733 A | 7/1984 | Lyons |
| 4,479,989 A | 10/1984 | Mahal |
| 4,484,351 A | 11/1984 | de Leeuwe et al. |
| 4,507,114 A | 3/1985 | Bohman et al. |
| 4,583,971 A | 4/1986 | Bocquet et al. |
| 4,586,928 A | 5/1986 | Barnes et al. |
| 4,589,879 A | 5/1986 | Pearson |
| 4,637,934 A | 1/1987 | White |
| 4,722,727 A | 2/1988 | Ogden et al. |
| 4,785,859 A | 11/1988 | Gustavsson et al. |
| 4,846,795 A | 7/1989 | Minagawa et al. |
| 5,006,114 A | 4/1991 | Rogers et al. |
| 5,065,783 A | 11/1991 | Ogle, II |
| 5,122,123 A | 6/1992 | Vaillancourt |
| 5,269,771 A | 12/1993 | Thomas et al. |
| 5,304,163 A | 4/1994 | Bonnici et al. |
| 5,308,347 A | 5/1994 | Sunago et al. |
| 5,330,464 A | 7/1994 | Mathias et al. |
| 5,334,180 A | 8/1994 | Adolf et al. |
| 5,380,315 A | 1/1995 | Isono et al. |
| 5,391,150 A | 2/1995 | Richmond |
| 5,514,123 A | 5/1996 | Adolf et al. |
| 5,533,994 A | 7/1996 | Meyer et al. |
| 5,540,674 A | 7/1996 | Karas et al. |
| 5,685,866 A | 11/1997 | Lopez |
| 5,700,248 A | 12/1997 | Lopez |
| 5,730,418 A | 3/1998 | Feith et al. |
| 5,738,663 A | 4/1998 | Lopez |
| 5,782,816 A | 7/1998 | Werschmidt et al. |
| 5,785,693 A * | 7/1998 | Haining | 604/249 |
| 5,810,398 A | 9/1998 | Matkovich |
| 5,873,862 A | 2/1999 | Lopez |
| 5,901,942 A | 5/1999 | Lopez |
| 5,902,298 A | 5/1999 | Niedospial, Jr. et al. |
| 5,928,204 A | 7/1999 | Lopez |
| 6,019,748 A | 2/2000 | Lopez |
| 6,029,946 A | 2/2000 | Doyle |
| 6,032,926 A | 3/2000 | Fuchs |
| 6,050,978 A | 4/2000 | Orr et al. |
| 6,113,068 A | 9/2000 | Ryan |
| 6,113,583 A | 9/2000 | Fowles et al. |
| 6,126,618 A | 10/2000 | Bischof |
| 6,132,403 A | 10/2000 | Lopez |
| 6,132,404 A | 10/2000 | Lopez |
| 6,132,413 A | 10/2000 | Mathias et al. |
| 6,156,025 A * | 12/2000 | Niedospial et al. | 604/408 |
| 6,179,821 B1 | 1/2001 | Caspary et al. |
| 6,245,048 B1 | 6/2001 | Fangrow, Jr. et al. |
| 6,280,431 B1 | 8/2001 | Domkowski et al. |
| 6,290,206 B1 | 9/2001 | Doyle |
| 6,299,131 B1 | 10/2001 | Ryan |
| 6,325,782 B1 | 12/2001 | Lopez |
| 6,394,992 B1 | 5/2002 | Sjoholm |
| 6,428,520 B1 | 8/2002 | Lopez et al. |
| 6,485,479 B1 | 11/2002 | Knierbein et al. |
| 6,491,679 B1 | 12/2002 | Okamoto et al. |
| 6,541,802 B2 | 4/2003 | Doyle |
| 6,572,592 B1 | 6/2003 | Lopez |
| 6,585,229 B2 | 7/2003 | Cote, Sr. et al. |
| 6,599,273 B1 | 7/2003 | Lopez |
| 6,635,044 B2 | 10/2003 | Lopez |
| 6,651,956 B2 | 11/2003 | Miller |
| 6,655,655 B1 | 12/2003 | Matkovich et al. |
| 6,681,946 B1 | 1/2004 | Jansen et al. |
| 6,745,998 B2 | 6/2004 | Doyle |
| 6,758,833 B2 | 7/2004 | Lopez |
| 6,840,501 B2 | 1/2005 | Doyle |
| 6,869,426 B2 | 3/2005 | Ganem |
| 6,875,203 B1 | 4/2005 | Fowles et al. |
| 6,932,795 B2 | 8/2005 | Lopez et al. |
| 6,945,417 B2 | 9/2005 | Jansen et al. |
| 6,955,669 B2 | 10/2005 | Curutcharry et al. |
| 7,004,934 B2 | 2/2006 | Vaillancourt |
| 7,025,389 B2 | 4/2006 | Cuschieri et al. |
| 7,037,302 B2 | 5/2006 | Vaillancourt et al. |
| 7,074,216 B2 | 7/2006 | Fowles et al. |
| 7,100,890 B2 | 9/2006 | Cote, Sr. et al. |
| 7,350,669 B2 | 4/2008 | Rani |
| 7,350,764 B2 | 4/2008 | Raybuck |
| 7,396,051 B2 | 7/2008 | Baldwin et al. |
| 7,396,348 B2 | 7/2008 | Newton et al. |
| 7,425,209 B2 | 9/2008 | Fowles et al. |
| 2002/0024036 A1 | 2/2002 | Rohrbough et al. |
| 2003/0093061 A1 * | 5/2003 | Ganem | 604/533 |
| 2003/0158537 A1 * | 8/2003 | Shiraishi et al. | 604/403 |
| 2004/0073174 A1 | 4/2004 | Lopez |
| 2004/0122414 A9 * | 6/2004 | Hurst et al. | 604/415 |
| 2004/0138626 A1 * | 7/2004 | Cote et al. | 604/249 |
| 2004/0186458 A1 | 9/2004 | Hiejima et al. |
| 2004/0199139 A1 | 10/2004 | Fowles et al. |
| 2004/0206924 A1 * | 10/2004 | Newton et al. | 251/149.1 |
| 2004/0243070 A1 | 12/2004 | Lopez |
| 2005/0090805 A1 | 4/2005 | Shaw et al. |
| 2005/0137566 A1 | 6/2005 | Fowles et al. |
| 2005/0222541 A1 | 10/2005 | Lopez et al. |
| 2006/0200087 A1 | 9/2006 | Lopez |
| 2006/0200091 A1 | 9/2006 | Lopez |
| 2006/0200092 A1 | 9/2006 | Lopez |
| 2006/0200093 A1 | 9/2006 | Lopez |
| 2006/0206058 A1 | 9/2006 | Lopez |
| 2006/0206059 A1 | 9/2006 | Lopez |
| 2006/0206060 A1 | 9/2006 | Lopez |
| 2006/0206061 A1 | 9/2006 | Lopez et al. |
| 2006/0229572 A1 | 10/2006 | Lopez |
| 2006/0264845 A1 | 11/2006 | Lopez |
| 2006/0264846 A1 | 11/2006 | Lopez |
| 2006/0264847 A1 | 11/2006 | Lopez |
| 2006/0264849 A1 | 11/2006 | Lopez et al. |
| 2006/0287638 A1 * | 12/2006 | Aneas | 604/411 |
| 2007/0007478 A1 | 1/2007 | Leinsing et al. |
| 2007/0012893 A1 | 1/2007 | Lee et al. |
| 2007/0021721 A1 | 1/2007 | Lopez |
| 2007/0038189 A1 * | 2/2007 | Bartholomew | 604/249 |
| 2007/0066965 A1 | 3/2007 | Coambs et al. |
| 2007/0173783 A1 | 7/2007 | Haindl |
| 2007/0299419 A1 | 12/2007 | Vancaillie et al. |
| 2008/0140021 A1 | 6/2008 | Richmond |
| 2008/0172024 A1 | 7/2008 | Yow |
| 2008/0190485 A1 | 8/2008 | Guala |
| 2008/0228163 A1 * | 9/2008 | Smith | 604/411 |
| 2009/0270832 A1 | 10/2009 | Vancaillie et al. |
| 2010/0049160 A1 | 2/2010 | Jepson et al. |
| 2010/0108681 A1 | 5/2010 | Jepson et al. |

FOREIGN PATENT DOCUMENTS

| | | |
|---|---|---|
| EP | 0811797 | 12/1997 |
| WO | WO 97/43573 | 11/1997 |
| WO | WO 0132524 A1 * | 10/2001 |
| WO | WO 2006/062912 | 6/2006 |

OTHER PUBLICATIONS

Baxter Healthcare Corporation, Clearlink Brochure (Aug. 2007) (2 pages).

Edwards Lifesciences LLC, VAMP and VAMP Jr. System Brochure (2002) (4 pages).

ICU Medical Inc., CLC2000® Brochure (circa Jun. 2007) (2 pages).

I-Flow Corporation, One Step KVO™ Brochure (Jan. 1999) (2 pages).

Maximus Medical, MaxPlus Brochure (circa Apr. 2007) (2 pages).

* cited by examiner

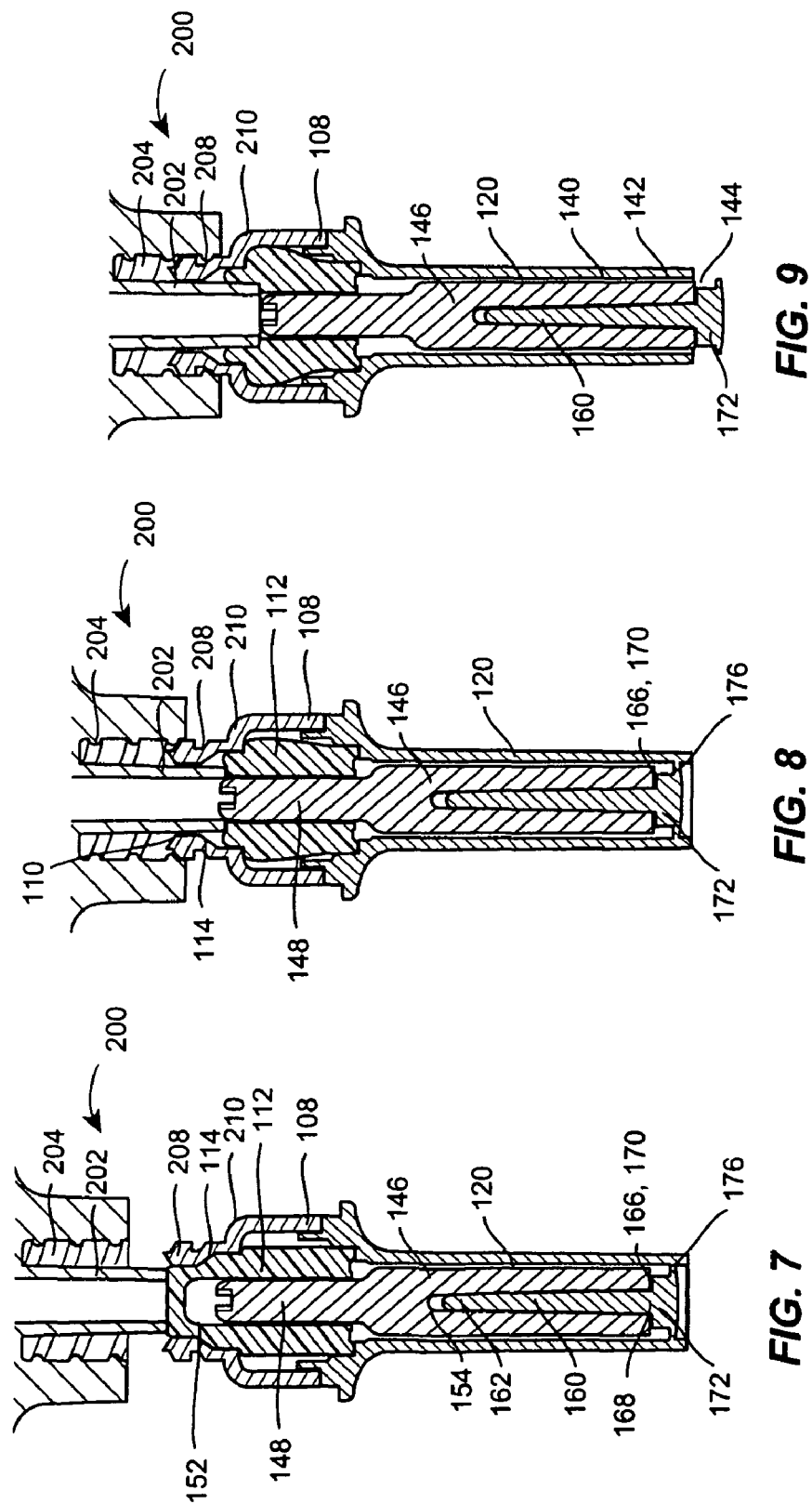

PORT ASSEMBLY FOR USE WITH NEEDLELESS CONNECTOR

BACKGROUND

This patent is directed to a port assembly for use with a needleless connector, and, in particular, to a port assembly for use with a needleless connector wherein the port assembly includes a solution barrier with a frangible boundary.

Intravenous ("I.V.") therapy involves the delivery of fluids to a patient through a vein. For example, a catheter is placed into the vein of the patient, and then fluids are administered to the patient through the catheter. Typically, the catheter is connected to an administration set in communication with a container, such as a flexible container or bag, from which fluids are infused into the patient.

The flexible container conventionally has two ports, an administration port ("admin port") and a medication port ("med port"), each port serving a different purpose. The admin port is used to access the solution in the container to infuse fluid from the container into the patient. The med port is used by a healthcare worker or a pharmacist to access the solution in the container to aspirate solution or to introduce medication and/or other substances (e.g., nutritional supplements, vitamins, etc.) into the container.

Both ports conventionally require the use of sharp objects to gain access to the solution in the container. The admin port is usually defined a thermoplastic tube or chimney with a solid thermoplastic membrane is disposed in the tube or chimney, the membrane preventing access to the solution in the container. A sharp spike (such as may conform to International Organization for Standardization Standard ISO 8536-4) is inserted into the tube or chimney, and advanced along the tube or chimney to pierce the membrane. The spike is attached to the administration set, and thereby establishes fluid communication between the container and the set. The med port conventionally usually includes a solid rubber septum that may be pierced using a needle, pointed cannula or other sharp instrument, such as a "reconstitution adapter".

The sharp, pointed instruments used to access the solution in the container via the admin or med ports represent an accidental puncture hazard to the healthcare worker or the pharmacist using the instrument, as well as a hazard to the patient, the equipment (e.g., the container), and others involved in the patient's healthcare. For example, the traditional unshrouded sharp spikes used to access the admin port can cause damage to container upon spiking. The spikes also present a puncture hazard to healthcare workers who handle the container as a waste container, especially where the container is a thin-film bag.

Moreover, there are other drawbacks to the conventional mechanisms used to access the solution in the container via conventional admin and med ports. For example, the use of the conventional sharp spike with an admin port can result in accidental disconnect, inadvertent touch contamination, and "no-flow" medication errors, which "no-flow" errors may result from the user failing to advance the spike far enough into the port in the absence of discrete feedback indicating complete connection. The ergonomic difficulty of connection/disconnection of the spike with the admin port may be aggravated where the tube or chimney that defines the admin port is flexible. On the med port side, the injection of medication using a syringe and needle requires non-trivial mechanical effort by the pharmacist or healthcare worker because of the small lumen size of the needle, when compared, for example, with the size of a conventional male luer. Conventional admin ports do not reseal, requiring the user to invert the bag when removing the sharp spike to prevent leakage.

As set forth in more detail below, the present disclosure sets forth an improved assembly embodying advantageous alternatives to the conventional devices discussed above.

SUMMARY OF THE INVENTION

According to an aspect, a fluid container is provided that includes a receptacle for retaining a fluid, and at least one conduit in communication with the receptacle. The at least one conduit is defined, at least in part, by a port assembly. The port assembly includes a valve housing with an inlet opening, a valve disposed in the valve housing to control access through the inlet opening, and a base joined to the valve housing and having a bore therethrough. The bore has a closed end defined by a frangible barrier, and a pushrod is disposed in the bore between the valve and the frangible barrier, axial movement of the pushrod causing rupture of the frangible barrier.

According to another aspect, a port assembly to be used in a conduit of a fluid container is provided. The port assembly includes a valve housing with an inlet opening, a valve disposed in the valve housing to control access through the inlet opening, and a base joined to the valve housing and having a bore therethrough. The bore has a closed end defined by a frangible barrier, and a pushrod is disposed in the bore between the valve and the frangible barrier, axial movement of the pushrod causing rupture of the frangible barrier Additional aspects of the disclosure are defined by the claims of this patent.

BRIEF DESCRIPTION OF THE DRAWINGS

It is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

FIG. 7 is an enlarged, cross-sectional view of a male needleless connector in use with the needleless port assembly of FIG. 1 in a preparatory state;

FIG. 8 is the combination of the male needleless connector and the needleless port assembly in an inserted state, prior to rupture of the solution barrier;

FIG. 9 is a combination of the male needleless connector and the needleless port assembly in an inserted state, after rupture of the solution barrier;

DETAILED DESCRIPTION OF VARIOUS EMBODIMENTS

Although the following text sets forth a detailed description of different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
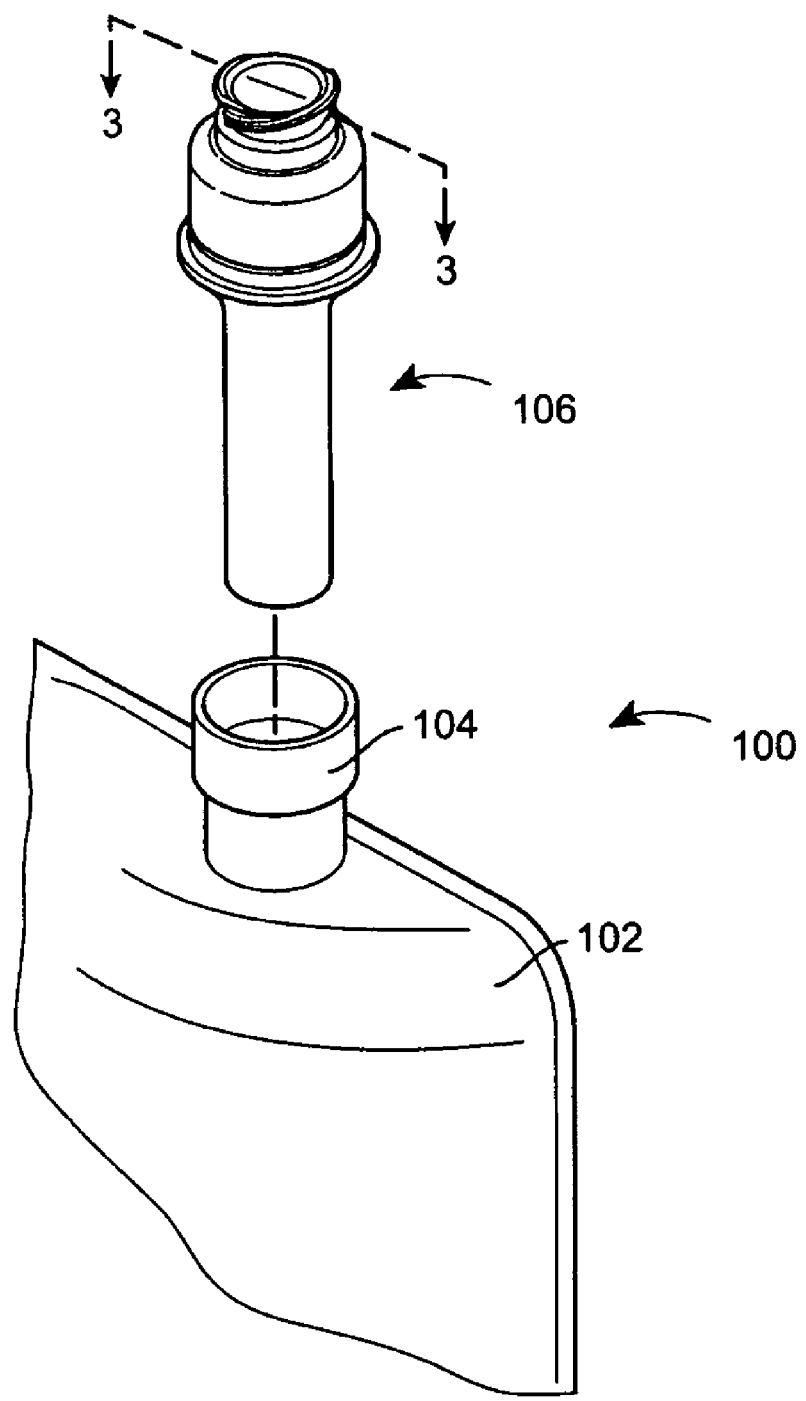
FIG. 1 is a fragmentary, perspective view of an embodiment of a fluid container with a needleless post assembly.

FIG. 1 illustrates a fluid container 100 according to the present disclosure. The fluid container 100 includes a receptacle 102 for retaining a fluid, and at least one conduit 104 in communication with the receptacle 102. As illustrated, the receptacle 102 is a flexible bag formed using a polymer. However, the receptacle 102 could be a rigid-wall container, such as a glass bottle, or other container, such as a cartridge, unfilled flexible container, etc.

The fluid container of FIG. 1 is illustrated in combination with a first embodiment of a needleless port assembly, or port assembly, 106. The needleless port assembly 106 is disposed in a port tube, as illustrated, to define the conduit 104. Although the port assembly 106 is shown separately from the port tube in the embodiment illustrated in FIG. 1, the port assembly 106 may include one or more structures that are integral with the remainder of the conduit 104, as illustrated and explained below.

Figure 2:
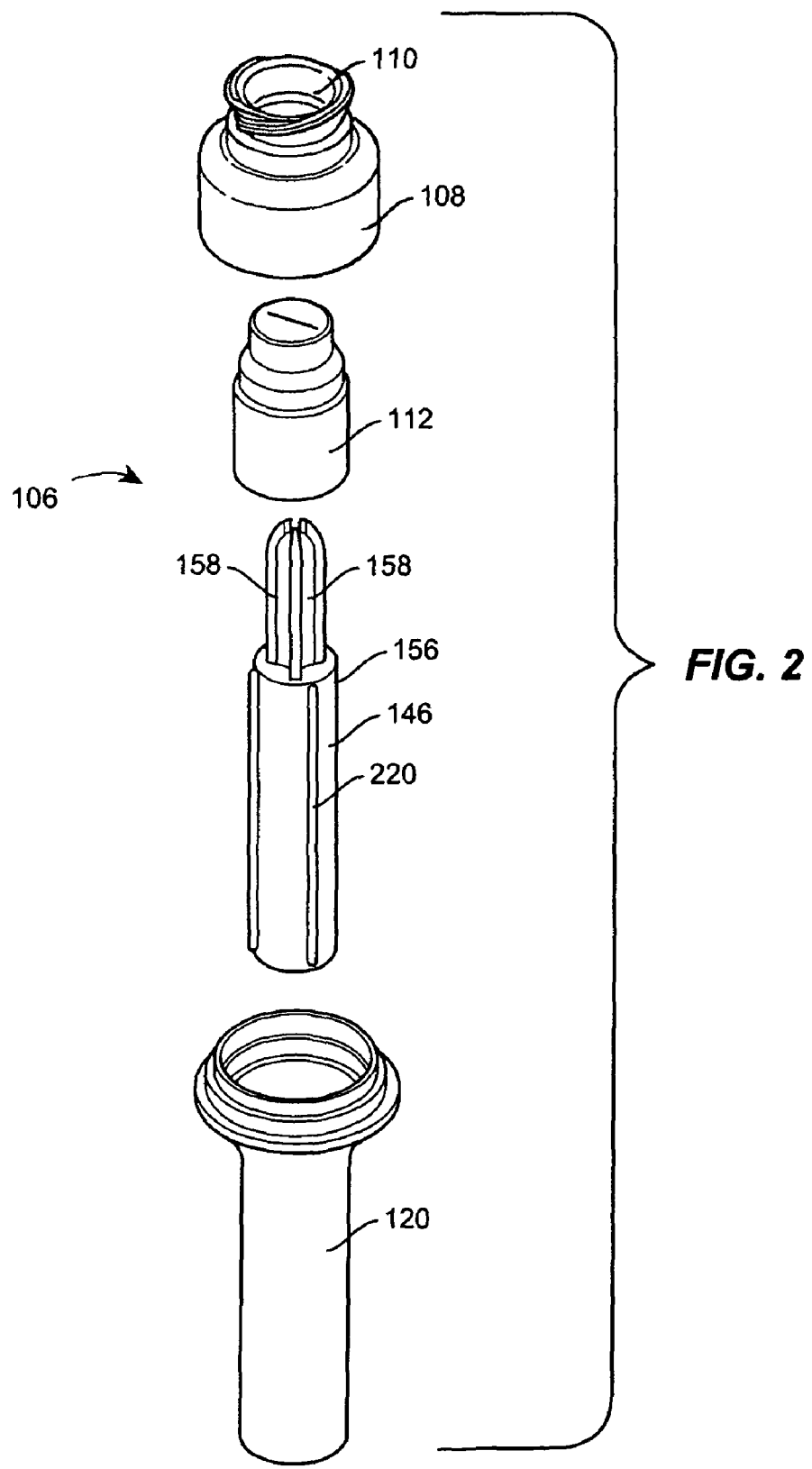
FIG. 2 is an exploded, perspective view of a needleless port assembly as shown in FIG. 1.
Figure 3:
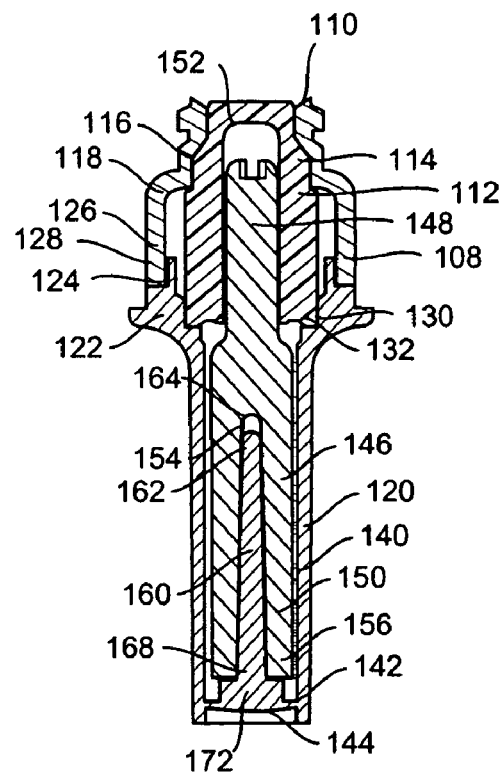
FIG. 3 is an enlarged, cross-sectional view of the needleless port assembly of FIG. 1 taken about line 3-3.

As seen in FIGS. 2 and 3, the port assembly 106 includes a valve housing 108 with an inlet opening 110 and a valve 112 disposed in the valve housing 108 to control access through the inlet opening 110. The valve 112 may be, as illustrated, a luer activated valve. As seen in FIG. 3, a first end 114 of the valve 112 abuts a seat 116 disposed at a first end 118 of the housing 108 about the inlet opening 110. The seat 116 may be defined by one or more shoulders that abut against one or more cooperating shoulders formed at the first end 114 of the valve 112. The valve 112 and the seat 116 fit together to form a seal to limit passage through the opening 110.

The port assembly 106 also includes a base 120 joined to the valve housing 108. In particular, the base 120 has a first end 122 with a shoulder 124. The shoulder 124 is received within an opening at a second end 126 of the housing 108, the opening being defined by a rim 128 of the housing 108. The shoulder 124 of the base 120 may be joined to the rim 128 of the housing 108 through known joining methods, such as by ultrasonic welding. The joint between the shoulder 124 and the rim 128 may form a liquid-tight seal.

The base 120 also includes a shoulder 130 that receives a second end 132 of the valve 112. The valve 112 is thus disposed between the housing 108 and the base 120. The cooperation between the shoulder 130 and the second end 132 of the valve 112 assists in maintaining the valve 112 firmly within the seat 116. In fact, as the valve 112 may be made of a flexible material, the distance between the seat 116 and the shoulder 130 may be selected to create a preload in the valve 112.

It will also be noted from FIG. 3, for example, that the base 120 has a bore 140 therethrough, with a closed end 142 defined by a frangible solution barrier 144 (which may also be more generally referred to as a barrier). The port assembly 106 further includes a pushrod 146 disposed in the bore 140 between the valve 112 and the frangible solution barrier 144. As will be explained in greater detail below with reference to FIGS. 7-9, axial movement of the pushrod 146 causes rupture of the frangible solution barrier 144.

From FIG. 3, it will be recognized that the pushrod 146 according to this embodiment has a first end 148 and a second end 150. The first end 148 of the pushrod 146 is received in a seat 152 defined in the valve 112. The second end 150 of the pushrod 146 has a seat 154 defined therein to receive at least a part of the frangible solution barrier 144. The pushrod 146 may also have an outer surface 156 with grooves 158 defined therein (see FIG. 2). The grooves 158 may assist in shaping the flow of fluid about the pushrod 146; the size and shape of the grooves 158 may also influence the amount of residual space in the port assembly 106. The grooves 158 may be shaped to minimize residual space, and yet provide adequate cross-sectional area to support required flowrates. In particular, when a luer comes to bear against the first end 148 of the pushrod 146, as shown in greater detail in FIGS. 7-9, the grooved arrangement (which may be referred to as castle grooves) at the first end 148 permits open cross-section for fluid flow while bearing the load from the luer. One advantage of such an arrangement may be to limit resistance to fluid flow through the luer and the assembly 106.

Figure 4:
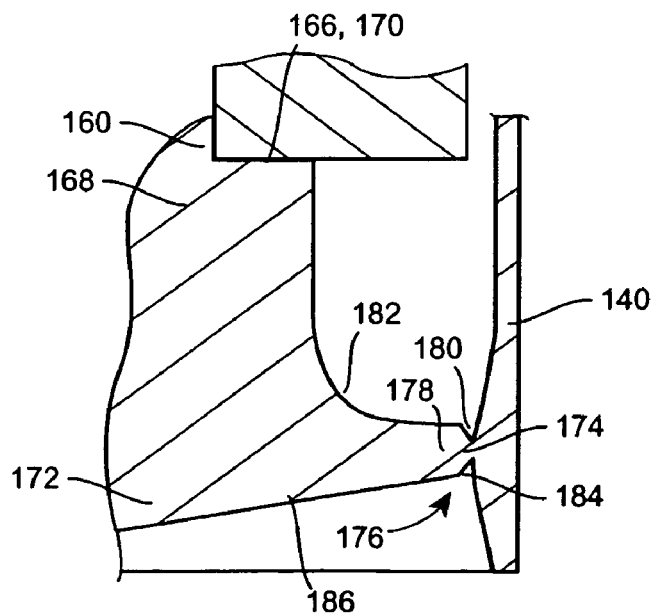
FIG. 4 is an enlarged, cross-sectional view of the junction between the solution barrier and the wall of the lower section of the assembly.

According to this embodiment, the frangible solution barrier 144 includes an elongated shaft 160 with a first end 162 that is received in the seat 154 defined in the second end 150 of the pushrod 146. As shown, the shaft 160 completely sits within the seat 154, although this need not be the case according to all embodiments. Also as illustrated, the first end 162 of the shaft 160 is spaced from the inner surface 164 of the seat 154. To limit the distance the shaft 160 depends into the seat 154, a surface 166 located at a second end 168 of the shaft 160 abuts a surface 170 of the base 120, as best seen in FIG. 4. By limiting the distance the shaft 160 depends into the seat 154, the forces transmitted by the pushrod 146 to the barrier 144 may be maximized in the region of the surface 170 because the forces will not be dissipated through application to the shaft 160.

As illustrated, the shaft 160 is attached to the pushrod 146. The shaft 160 is attached to the pushrod 146 to prevent the pushrod 146 from floating into the solution after the barrier 144 is ruptured. To this end, the pushrod 146 may be press-fitted onto the shaft 160. In fact, according to certain embodiments, crushable ribs may be attached to an outer surface of the shaft 160 or on an inner surface of the seat 154, so that complete placement of the pushrod 146 is permitted of a typical tolerance stackup range. Alternatively, the pushrod 146 may be joined to the barrier 144 at the mating surfaces 166, 170, either continuous or discretely, using a ball-and-socket snap-fit mechanism wherein the ball is defined on one of the surfaces 166, 170 and the socket is defined on the other of the surfaces 166, 170. As a further alternative, the surfaces 166, 170 may be joined using an adhesive, welding, etc. It will be further recognized that while the barrier 144 and the pushrod 146 have been illustrated as separated structural elements, these elements could instead be formed (e.g., molded) as a single piece.

As illustrated in FIGS. 3 and 4, the elongated shaft 160 has a circular plate 172 joined to the second end 168 of the elongated shaft 160. The circular plate 172 is joined at an edge 174 to the bore 140 of the base 120 along a frangible boundary 176. The plate 172 may be joined to the bore 140 by molding the shaft 160 and plate 172 as a single piece with the base 120, for example. Alternatively, the shaft 160 and plate 172 may be formed separately, and then joined together by another mechanism (e.g., snap-fit, adhesive, welding, etc.)

As is illustrated in greater detail in FIG. 4, the frangible boundary 176 may be defined by a section 178 of decreased wall thickness relative to the plate 172 and the attachment point to the base 120. In addition, the section 178 may include a first sharp notch 180 at the junction between the plate 172 and the base 120 on a first side 182 of the plate 172, and a second sharp notch 184 on a second side 186 of the plate 172. While the illustrated embodiment includes a pair of notches 180, 184, a single notch may be used on either side 182, 186 of the plate 172.

Figure 5:
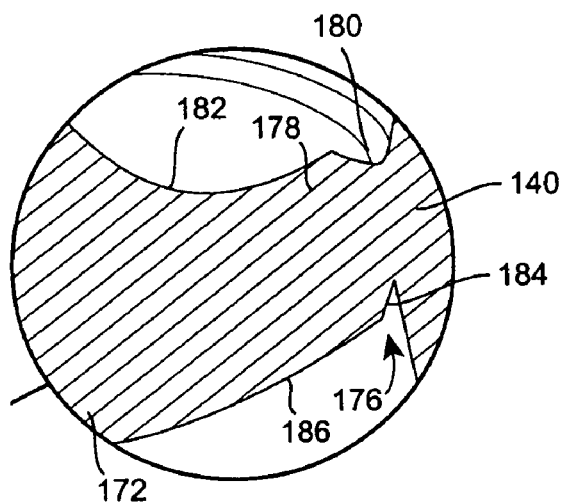
FIG. 5 is an enlarged, cross-sectional view of the junction between the solution barrier and the wall of the lower section of the assembly in a deformed condition.

The notches 180, 184 work in conjunction with the plate 172 to focus the forces at the junction with the bore 140 of the base 120. In particular, the notches 180, 184 concentrate the stress and plastic strain that occurs when force is applied to the barrier 144 via the pushrod 146. In addition, the thickness of the plate 172 at the junction with the bore 140 is sufficiently thin to allow limited bending to occur, as illustrated in the cross-sectional view of FIG. 5. The bending of the plate 172 contributes to the localization of the stress and strain concentration that occurs at the notches 180, 184. It is believed that a wider plate 172 could further increase the bending and deformation, leading to further increases in stress and strain concentration, although it would also require a greater activation force.

The concentration of stress and strain caused by the notches 180, 184 may have one or more advantages. For example, the concentration of stresses caused by the notches 180, 184 permits the location of the fracture of the barrier 144 to be determined through placement of the notches. The concentration caused by the notches 180, 184 also may lead to a reduction in the force required to fracture the barrier 144. Stated slightly differently, the concentration may reduce the amount of displacement that is required to occur before the barrier 144 ruptures. A reduction in the amount of displacement required to rupture the barrier 144 may have the further effect of maximizing the likelihood that the barrier 144 will rupture (i.e., the port assembly 106 will be activated) when using the widest range possible of male luer devices.

The effects of the sharp notches 180, 184 on reducing displacement requirements may be further enhanced through the use of notch sensitive materials with triaxial stress systems. Notch sensitive materials fracture in a more brittle manner in the presence of a sharp notch than in the absence of a notch; in the absence of a notch, these materials would fracture in a ductile manner. A non-exhaustive list of notch sensitive materials may include polycarbonate, nylon 66, polyoxymethylene, polyvinylchloride, polyethylene terephthalate, cellulose acetate, and polypropylene. By using one of these materials in combination with the sharp notches 180, 184, the amount of displacement required for activation may be reduced.

Figure 6:
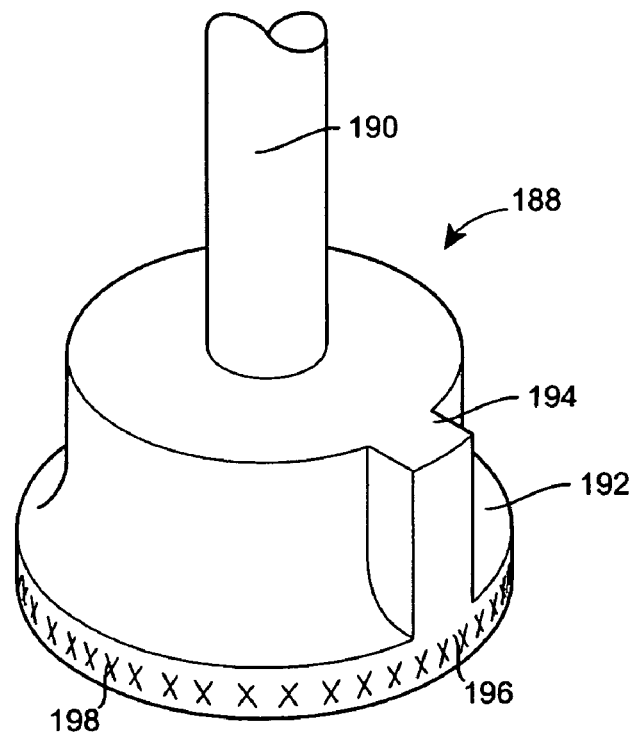
FIG. 6 is an enlarged, fragmentary perspective view of an alternative embodiment of a solution barrier according to the present disclosure.
Figures 10, 11:
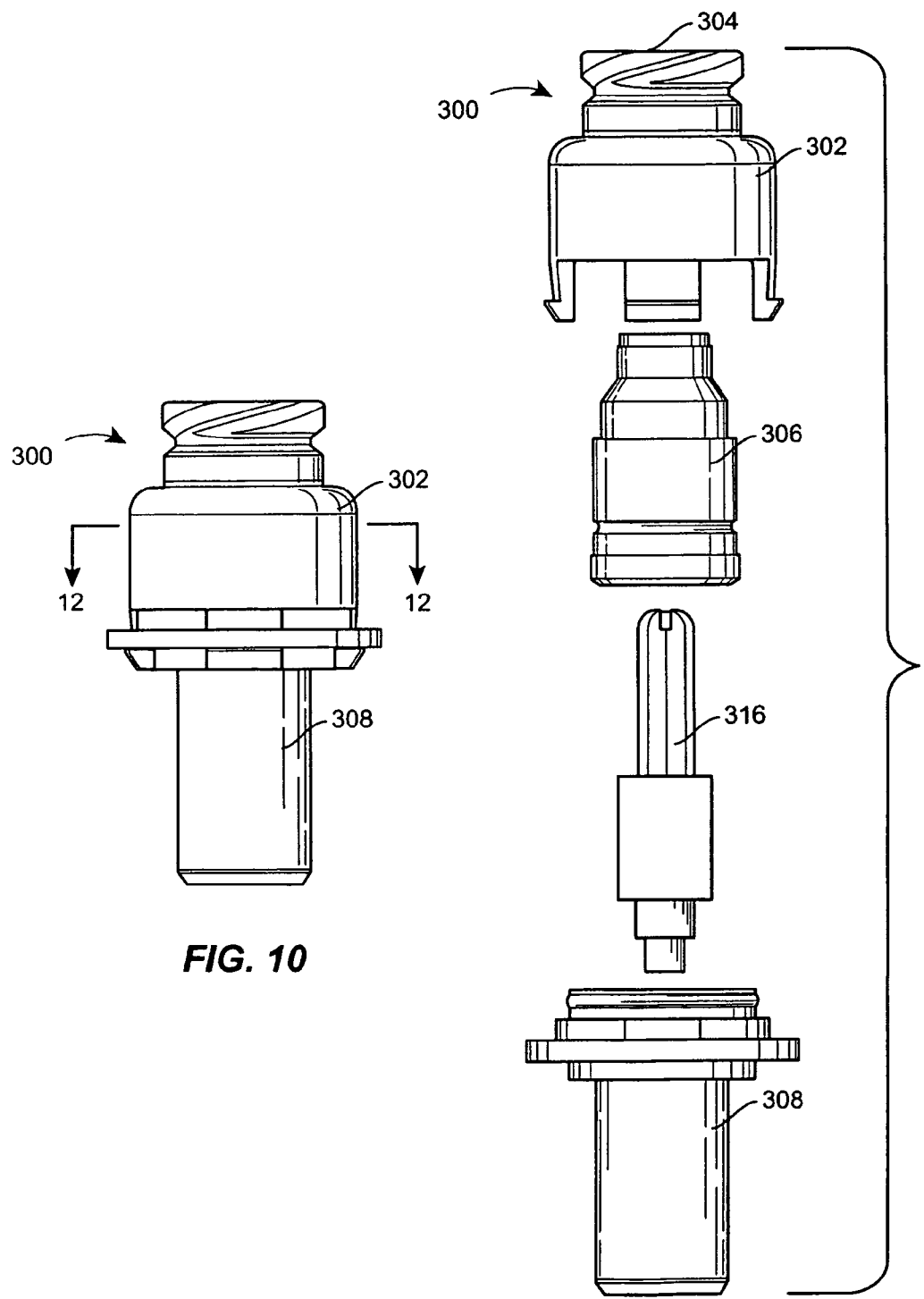
FIG. 10 is an enlarged, perspective view of another needleless port assembly.
FIG. 11 is an exploded, perspective view of the needleless port assembly as shown in FIG. 10.

A further enhancement that may be used in conjunction with the notches 180, 184 is illustrated in FIG. 6. The barrier 188 is shown separated from the remainder of the respective base, although it will be understood that the barrier 188 is intended to be formed with the remainder of the base as illustrated in the embodiment of FIGS. 1-5, 7-9, and 10-22. The barrier 188 illustrated in FIG. 6 includes a shaft 190 and a plate 192. Additionally, the barrier 188 includes a rib 194. The rib 194 acts to localize and enhance the stresses in a region 196 about the rib 194 through a local stiffening of the structure. The fracture initiates in the region 196 before propagating around a circumference 198 of the plate 192. In particular, it is believed that the presence of the rib 194 will reduce the force required for activation by placing a small area in shear initially and leading to failure in a tearing mode.

The operation of the embodiment of the port assembly 106 is now discussed with reference to FIGS. 7-9. The port assembly 106 is illustrated in FIGS. 7-9 in combination with a male needleless connector 200, which cooperates with the port assembly 106. The connector 200 has a luer 202 that is surrounded by a threaded region 204. The threaded region 204 of the connector 200 is intended to cooperate with threads 208 on an outer surface 210 of the housing 108, such a connector 200 being referred to as a "luer lock." However, according to certain embodiments of the present disclosure, the port assembly 106 may be used with a connector without a threaded region, such a connector being referred to as a "slip luer."

As shown in the preparatory position in FIG. 7, the luer 202 is just coming into contact with the first end 114 of the valve 112. The first end 148 of the pushrod 146 is seated within the seat 152; however, some clearance space exists between the first end 148 of the pushrod 146 and the first end 114 of the valve 112. By contrast, the surface 166 of the pushrod 146 is seated to its full extent on the surface 170 of the base 120 adjacent the second end 168 of the shaft 160.

As the luer 202 is advanced into the inlet opening 110, with the threads 208 of the housing 108 interacting with the threaded region 204 of the connector 200, the first end 114 of the valve 112 and the luer 202 is advanced in the direction of the first end 148 of the pushrod 146. As the luer 202 advances, the clearance space mentioned relative to FIG. 7 is traversed by the luer 202 and first end 114 of the valve 112. Preferably, the clearance space is defined to allow at least minimal thread engagement between the threaded region 204 of the connector 200 and the threads 208 of the housing 108 before the luer 202 abuts the first end 148 of the pushrod 146. Once the luer 202 traverses the clearance space, the luer 202 abuts the first end 148 of the pushrod 146.

Further tightening of the connector 200 on to the housing 108 causes the force to be applied via the pushrod 146 and plate 172 to the frangible boundary 176. Eventually, the force necessary to rupture the frangible boundary 176 is exceeded, and the barrier 144 ruptures at the end 142 of the bore 140, as shown in FIG. 9. It should be noted that the choice of the material, geometry and notch properties of the barrier 144 may be influenced by the desire to have the barrier 144 rupture within the travel distance defined by conventional luers, including syringes and I.V. set connectors, with a nozzle-projection distance defined by International Organization for Standardization Standard ISO-594 as well as those with a nozzle-projection distance less than that defined by ISO-594. Furthermore, accommodation of luers with a nozzle-projection distance greater than that defined by ISO-594 may influence the clearance depth required to allow for thread engagement prior to abutment of the luer against the pushrod 146. As a consequence of these considerations, certain embodiments of the present disclosure have pushrod travel of approximately 1.78 mm (0.070 inches).

Fluid then is able to follow through the inlet opening 110 and the bore 140 about the pushrod 146; this flow may be assisted by the grooves 158 referred to above.

To maintain the combination of the pushrod 146 and the frangible solution barrier 144 in the position illustrated in FIG. 9, the pushrod 146 may include crushable fins 220 disposed on the outer surface 156 of the pushrod 146 facing the bore 140, as illustrated in FIG. 2. When the pushrod 146 reaches the position illustrated in FIG. 9, the crushable fins 220 collapse under the force applied, thereby maintaining the pushrod 146 and the frangible solution barrier 144 in the position illustrated in FIG. 9.

The embodiment of FIGS. 1-5 and 7-9 is but a single embodiment of the port assembly according to the present disclosure. Other embodiments are illustrated in FIGS. 10-17. It will be recognized, however, that aspects of the embodiments illustrated in the FIGS. 10-17 may be used with the embodiments of FIGS. 1-9, and vice versa. For example, while a snap-tight fit is discussed below relative to the embodiment of FIGS. 10-15, a method of joining as described above (e.g., ultrasonic welding) may be used in its place. Other variations are possible.

Figure 12:
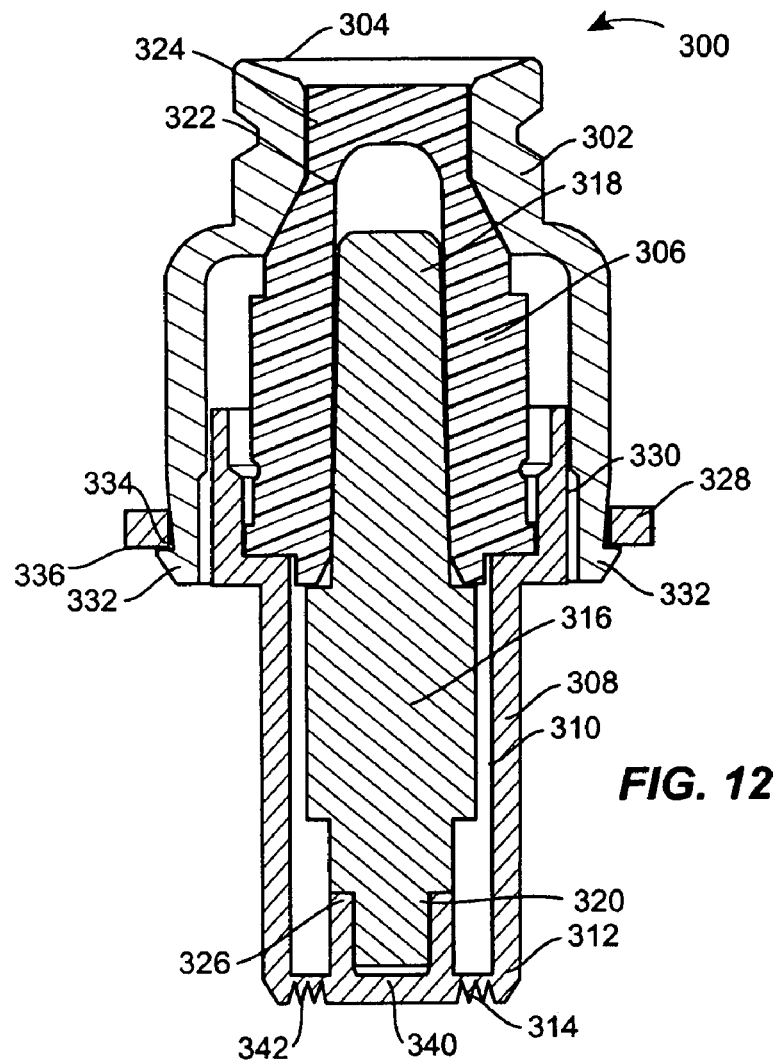
FIG. 12 is an enlarged, cross-sectional view of the needleless port assembly of FIG. 10 as taken along line 12-12.

Thus, as is seen in FIGS. 10-15, another embodiment of a port assembly 300 is illustrated. This port assembly 300, like that of FIGS. 1-5 and 7-9, includes a valve housing 302 with an inlet opening 304 and a valve 306 disposed in the valve housing 302 to control access through the inlet opening 304. The port assembly 300 also includes a base 308 joined to the valve housing 302. As seen in FIG. 12, the base 308 has a bore 310 therethrough, with a closed end 312 defined by a frangible solution barrier 314. Finally, the port assembly 300 includes a pushrod 316 disposed in the bore 310 between the valve 306 and the frangible solution barrier 314.

Like the embodiment of FIGS. 1-5 and 7-9, the pushrod 316 has a first end 318 and a second end 320, and the first end 318 of the pushrod 316 is received in a seat 322 defined in the valve 306. Additionally, the first end 318 of the pushrod 316 is spaced from a first end 324 of the valve 306 to define a clearance space therebetween, a luer having to traverse the clearance space before the luer can abut against and cooperate with the first end 318 of the pushrod 316. However, unlike the embodiment of FIGS. 1-5 and 7-9, the second end 320 of the pushrod 316 is received in a seat 326 formed with the frangible solution barrier 314.

Figure 13:
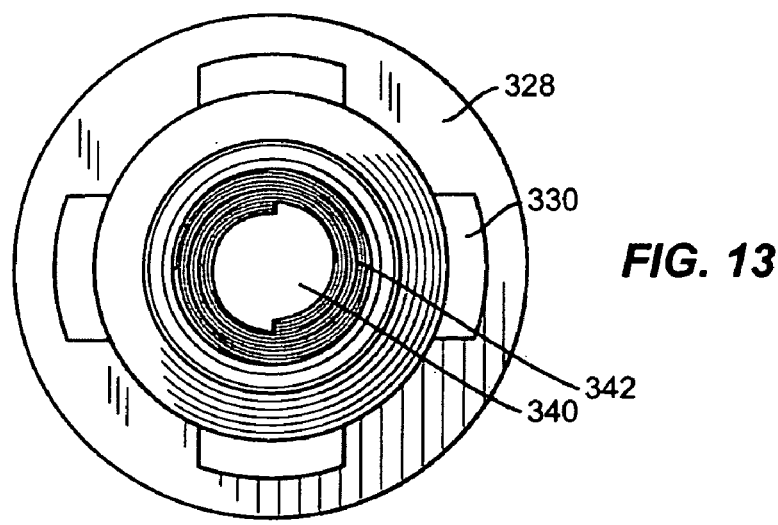
FIG. 13 is an enlarged end view of the needleless port assembly of FIG. 10.

The embodiment of the port assembly 300 illustrated in FIGS. 10-15 differs from that of FIGS. 1-5 and 7-9 in that the housing 302 is not ultrasonically welded to the base 308. Instead, the base 308 has a flange 328 with openings 330 formed therethrough (see also FIG. 13). While four openings 330 are shown in FIG. 13, a greater or lesser number of openings 330 may be used. The housing 302 includes four hooks 332, each having an edge 334 that cooperates with a surface 336 of the flange 328. The cooperation of the edge 334 and the surface 336 limit separation of the housing 302 and the base 308.

The embodiment of the port assembly illustrated in FIGS. 10-15 also differs from that illustrated in FIGS. 1-5 and 7-9 in the shape and operation of the frangible solution barrier 314. In the embodiment illustrated in FIGS. 10-15, the frangible solution barrier 314 includes a structure that is intended to remain attached to the housing as a consequence of the motion of the pushrod. The frangible solution barrier 314 includes a plate 340 circumscribed by a frangible boundary 342 in the form of a helical frangible boundary. As shown in FIGS. 12 and 13, for example, the frangible boundary is formed on a planar surface of the base 308.

Figure 14:
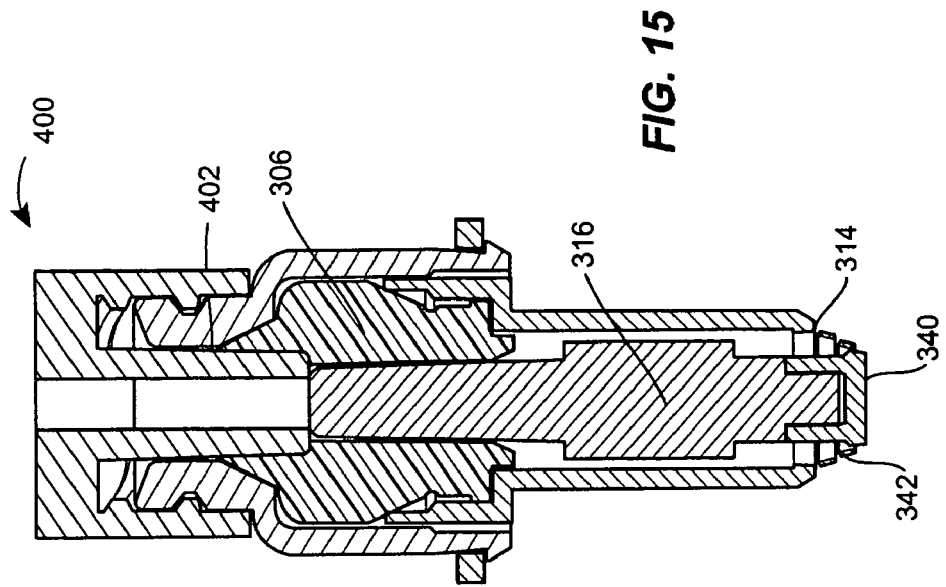
FIG. 14 is an enlarged, cross-sectional view of a male needleless connector in use with the needleless port assembly of FIG. 10 in a partially inserted state.
Figure 15:
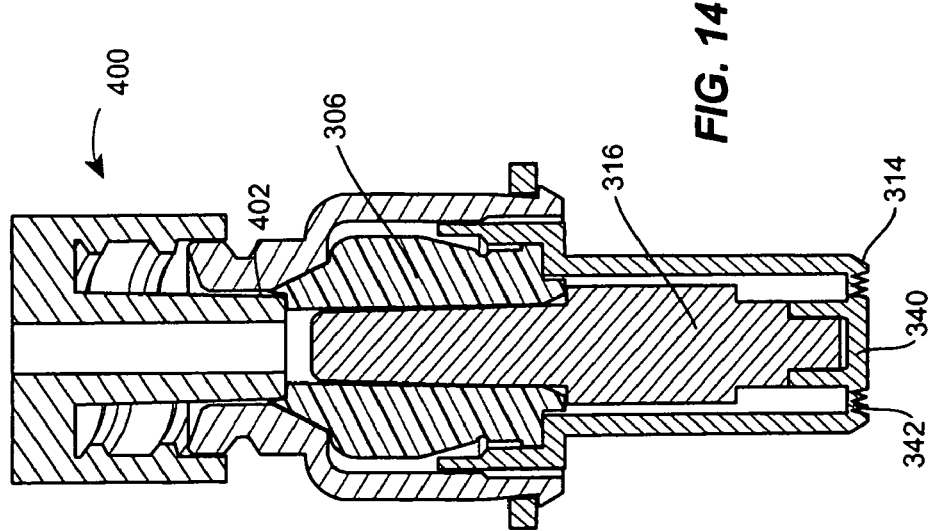
FIG. 15 is the combination of the male needleless connector and the needleless port assembly in an inserted state, after rupture of the solution barrier.

As is shown in FIGS. 14 and 15, a male connector 400 having a luer 402 is used to move a first end of the valve 306, causing the pushrod 316 to act outwardly on the frangible solution barrier 314, rupturing along the helical frangible boundary 342. The fluid is permitted to pass through the ruptured sections of the boundary 342, while the pattern of the boundary 342 is such that the plate 340 remains attached to the base 308, and therefore does not pass into the associated container.

Figure 16:
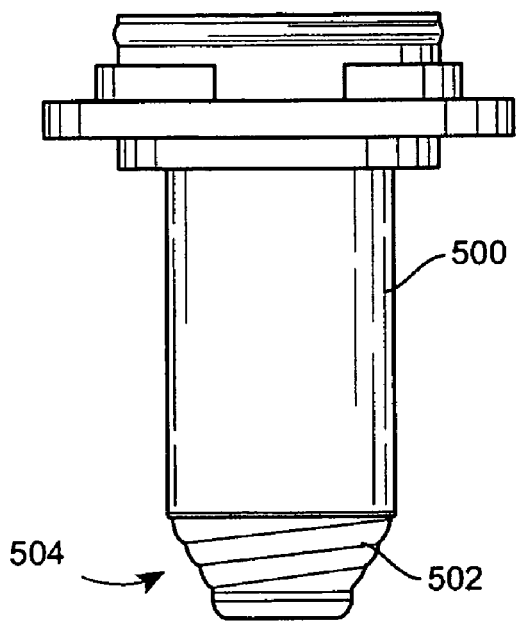
FIG. 16 is an enlarged, perspective view of a base of a further needleless port assembly.
Figure 17:
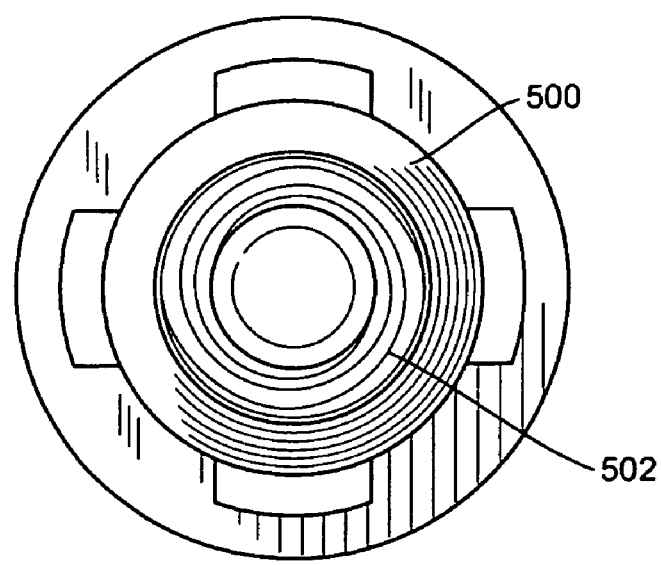
FIG. 17 is an enlarged end view of the base of FIG. 16.

A further embodiment is illustrated in FIGS. 16 and 17, or more particularly a base 500 of a further embodiment is illustrated in FIGS. 16 and 17. This embodiment would be formed identically to that of FIGS. 10-15 except that a frangible boundary 502 is formed on a conical surface 504 of the base 500. As a consequence, the length of the pushrod would need to be altered, but the port assembly incorporating the base 500 would otherwise operate similarly. For that matter, while the embodiments of FIGS. 1-5 and 7-9 and FIGS. 10-15 illustrate embodiments wherein the frangible boundary is disposed on a horizontal surface, and the embodiment of FIGS. 16 and 17 illustrate an embodiment wherein the frangible boundary is disposed on a conical surface, the frangible boundary may be disposed on a variety of surfaces, including a relatively vertical surface (e.g., on the surface of a cylinder).

In either the embodiment of FIGS. 10-15 or the embodiment of FIGS. 16 and 17, the length of the boundary 342, 502 and number of elements (grooves) that define the boundary 342, 502 may vary. According to one exemplary embodiment, a single groove may form a circular path with a thicker ligament separating the ends to form a hinge when activated. Such a configuration may minimize the deformation required for activation.

Figure 18:
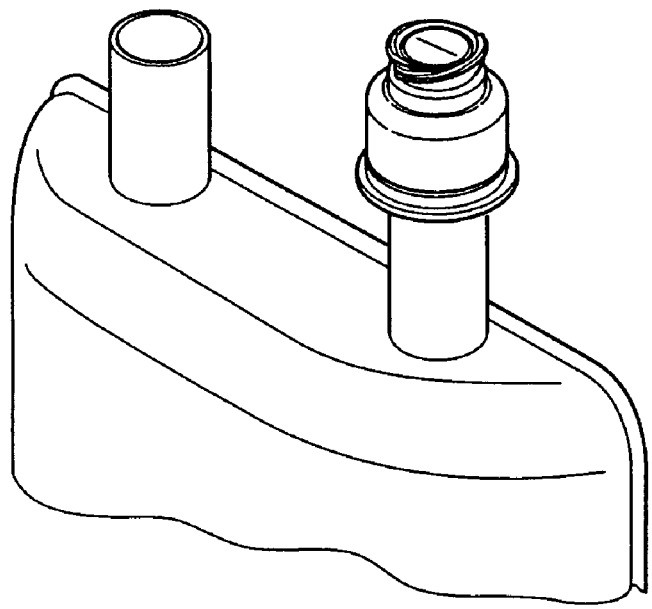
FIG. 18 is a perspective view of a two-port fluid container with a needleless port assembly introduced into one port tube.
Figure 19:
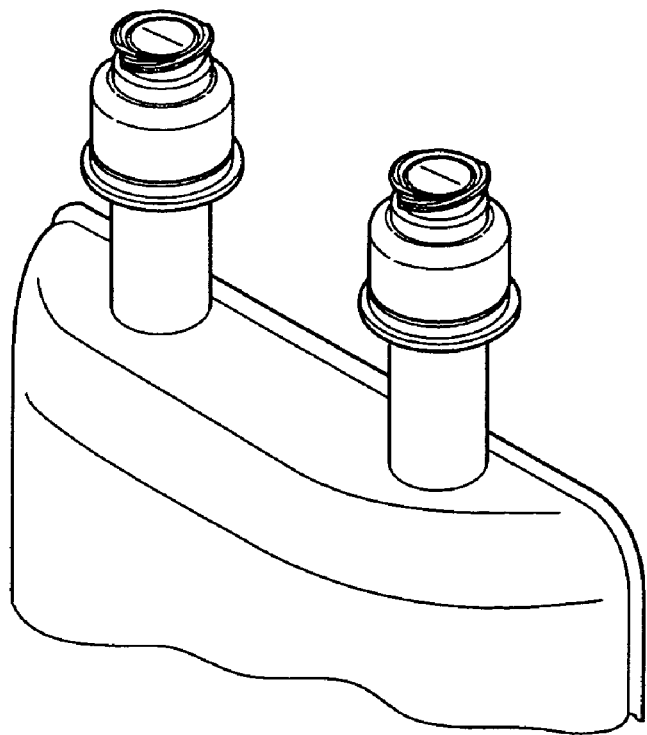
FIG. 19 is a perspective view of a two-port fluid container with a needleless port assembly introduced into both port tubes.
Figure 20:
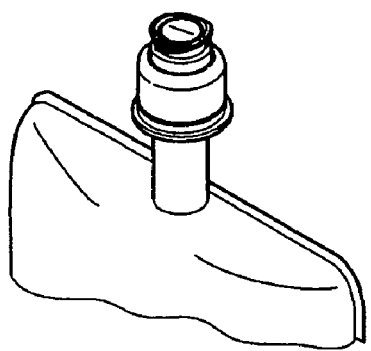
FIG. 20 is a perspective view of a one-port fluid container with a needleless port assembly introduced into the port tube.
Figure 21:
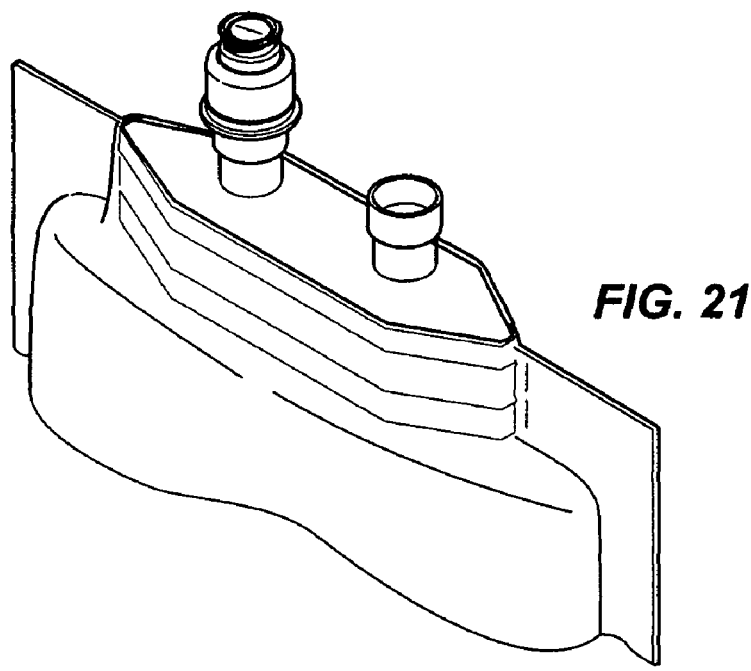
FIG. 21 is a perspective view of a two-port fluid container having a gondola with a needleless port assembly introduced into one chimney.
Figure 22:
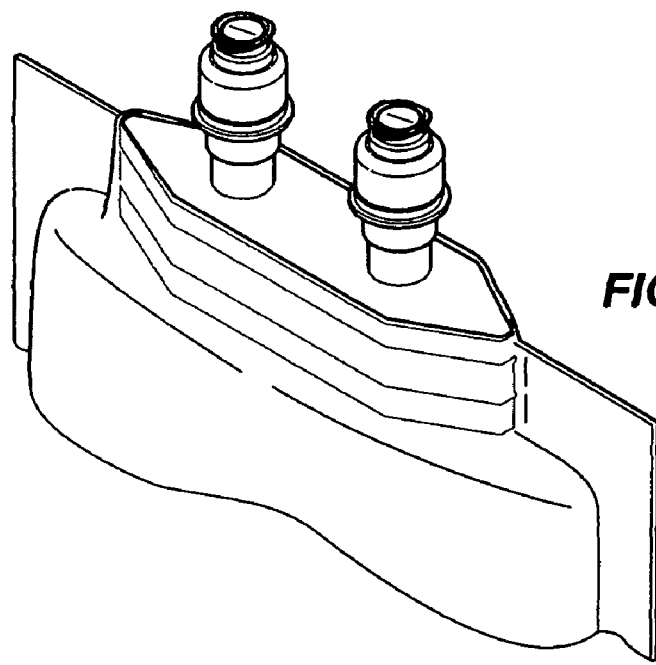
FIG. 22 is a perspective view of a two-port fluid container having a gondola with a needleless port assembly introduced into both chimneys.

As illustrated in FIGS. 18-24, a needleless port assembly according to any of the embodiments described above may be incorporated into a fluid container according to any of a variety of configurations. FIGS. 18-20 illustrate embodiments wherein a fluid container includes a port tube, the port assembly disposed in the port tube to define the conduit. FIGS. 21 and 22 illustrate embodiments wherein a fluid container includes a gondola, the gondola including a chimney that is formed integrally with the base of the port assembly to define the conduit. It will be recognized that typically the port assemblies would have sterile port protectors or caps covering the ends; the caps have not been shown to facilitate visualization of the port assembly placement. As a further alternative, the port assembly may have a peelable foil seal disposed over the inlet opening 110 as a sterility protector.

It will be recognized that in a fluid container having two port tubes, at least one of the port tubes is used by a pharmacist to add medication or other materials to the fluids in the bag, and is referred to as the medication port, while at least one of the other port tubes is used by the healthcare professionals to connect the fluid container to the line, and is referred to as the administration port. FIG. 18 illustrates an embodiment wherein the port assembly is utilized in the medication port, and another mechanism, such as a conventional spike, is used in the administration port. FIG. 19 illustrates an embodiment wherein a port assembly according to the present disclosure is utilized in both the administration and the medication ports. By contrast, FIG. 20 illustrates an embodiment wherein the port assembly is utilized in a single port container.

Fluid containers utilizing gondolas have a similar convention relative to the designation of medication and administration ports, the use of the gondola resulting from difficulties occurring in joining the chimney material to the receptacle material. FIG. 21, like FIG. 18, illustrates an embodiment wherein the port assembly is utilized in the medication port. FIG. 22, like FIG. 19, illustrates an embodiment wherein the port assembly is utilized in the administration and medication ports. In particular, relative to the embodiment utilizing a gondola, the base 120 may be formed integrally (i.e., as one piece) with the gondola, as discussed above.

Use of the above-mentioned port assembly, according to any of the various embodiments described herein, as the med port for a container may provide one or more of the following advantages relative to conventional med ports. As an initial matter, the use of the port assembly as described herein eliminates the use of sharp instruments, such as needles and reconstitution adapters, as have been used with conventional med ports, thereby eliminating the hazard posed to the pharmacist and the equipment (e.g., the container). Additionally, because the size of the luer used with luer-activated valves is significantly larger than the lumen size of needles used with the conventional med ports, there may be a reduced force required to aspirate solution or inject a substance into the container via the port assembly. Further, the port assemblies according to the present disclosure are expected to be significantly more durable relative to conventional med ports, given the quality of the reseal possible with a luer-activated valve relative to a septum that may be repeatedly perforated in use.

Similarly, use of the port assembly, according to any of the various embodiments described above, as the administration port may provide one or more of the following advantages relative to conventional admin ports. Replacement of the conventional admin port with the port assemblies according to the present disclosure would eliminate use of the conventional sharp spike, thereby eliminating a potential puncture hazard to equipment, patients, and healthcare workers. Furthermore, given that the administration set may now be connected to the container through the threaded engagement of a male luer connector attached to the set to the port assembly as disclosed, accidental disconnects may be limited. Further, the threaded engagement of the luer connector to the port assembly according to the present disclosure may provide a discrete feedback to the healthcare worker of complete connection, limiting "no-flow" medication errors. Additionally, the port assemblies according to the present disclosure would limit the ergonomic difficulties in fitting the conventional spikes into flexible tubes or chimneys.

Further, it will also be recognized that the port assemblies according to the present disclosure facilitate use of a single port as admin port and med port. That is, convention admin ports did not have a resealable membrane, such that once the membrane was ruptured, leakage would occur. This presents an obstacle to use of conventional admin ports as med ports, which by the nature need to be resealable. Similarly, conventional med ports required a sharp, pointed instrument, such as a needle, to penetrate the septum. The flow rates possible through a needle are insufficient to permit connection of the administration set to the container in this fashion. However, because a male luer will provide flow rates sufficient for use of the port assembly as an admin port, the same luer-activated port assembly used first as a med port may later be used as an admin port as well.

We claim:

1. A fluid container comprising:
    a receptacle for retaining a fluid;
    at least one conduit in communication with the receptacle; and
    the at least one conduit defined, at least in part, by a port assembly,
    the port assembly including a valve housing with an inlet opening, a valve disposed in the valve housing to control access through the inlet opening, a base joined to the valve housing and having a bore therethrough, the bore having a closed end defined by a frangible barrier comprising a plate joined at an edge to the bore along a frangible boundary, and a pushrod disposed in the bore between the valve and the frangible barrier, axial movement of the pushrod in the direction of the plate causing rupture of the frangible barrier along the frangible boundary.

2. The fluid container of claim 1, wherein the pushrod has a first end and a second end, the first end of the pushrod being received in a seat defined in the valve, and the second end of the pushrod have a seat defined therein to receive at least a part of the frangible barrier.

3. The fluid container of claim 1, wherein the frangible barrier further comprises an elongated shaft with a first end that is received in the seat defined in the second end of the pushrod and a second end, and the plate comprising a circular plate joined to the second end of the elongated shaft, the circular plate joined at an edge to the bore of the base along the frangible boundary.

4. The fluid container of claim 3, wherein the frangible boundary is defined by a section of decreased wall thickness.

5. The fluid container of claim 4, wherein the pushrod has crushable fins disposed on an outer surface of the pushrod facing an inner surface of the bore.

6. The fluid container of claim 5, wherein the pushrod has grooves defined in the outer surface of the pushrod.

7. The fluid container of claim 1, wherein the pushrod has a first end and a second end, the first end of the pushrod being received in a seat defined in the valve, and the second end of the pushrod being received in a seat formed in the frangible barrier.

8. The fluid container of claim 7, wherein the frangible barrier comprises a helical frangible boundary.

9. The fluid container of claim 8, wherein the helical frangible boundary is formed on a planar surface of the base.

10. The fluid container of claim 8, wherein the helical frangible boundary is formed on a conical surface of the base.

11. The fluid container according to claim 1, wherein the valve comprises a luer activated valve.

12. The fluid container according to claim 1, wherein the fluid container comprises a gondola, the base formed integrally with the gondola and defining the least one conduit.

13. The fluid container according to claim 1, wherein the fluid container comprises a port tube, the base disposed in the port tube to define the at least one conduit.

14. The fluid container of claim 1, wherein the frangible barrier fractures along the frangible boundary.

15. The fluid container of claim 1, wherein the plate is detached completely from the base along the frangible boundary with the rupture of the frangible barrier.

16. The fluid container of claim 1, wherein the plate is attached to the base with the rupture of the frangible barrier along the frangible boundary.

17. A port assembly to be used in a conduit of a fluid container, the port assembly comprising:
   a valve housing with an inlet opening,
   a valve disposed in the valve housing to control access through the inlet opening,
   a base joined to the valve housing and having a bore therethrough, the bore having a closed end defined by a frangible barrier comprising a plate joined at an edge to the bore along a frangible boundary, and
   a pushrod disposed in the bore between the valve and the frangible barrier, axial movement of the pushrod in the direction of the plate causing rupture of the frangible barrier along the frangible boundary.

18. The port assembly of claim 17, wherein the pushrod has a first end and a second end, the first end of the pushrod being received in a seat defined in the valve, and the second end of the pushrod have a seat defined therein to receive at least a part of the frangible barrier.

19. The port assembly of claim 17, wherein the frangible barrier further comprises an elongated shaft with a first end that is received in the seat defined in the second end of the pushrod and a second end, and the plate comprising a circular plate joined to the second end of the elongated shaft, the circular plate joined at an edge to the bore of the base along the frangible boundary.

20. The port assembly of claim 19, wherein the frangible boundary is defined by a section of decreased wall thickness.

21. The port assembly of claim 20, wherein the pushrod has crushable fins disposed on an outer surface facing an inner surface of the bore.

22. The port assembly of claim 21, wherein the pushrod has grooves in the outer surface of the pushrod.

23. The port assembly of claim 17, wherein the pushrod has a first end and a second end, the first end of the pushrod being received in a seat defined in the valve, and the second end of the pushrod being received in a seat formed in the frangible barrier.

24. The port assembly of claim 23, wherein the frangible barrier comprises a helical frangible boundary.

25. The port assembly of claim 24, wherein the helical frangible boundary is formed on a planar surface of the base.

26. The port assembly of claim 24, wherein the helical frangible boundary is formed on a conical surface of the base.

27. The port assembly of claim 17, wherein the frangible barrier fractures along the frangible boundary.

28. The port assembly of claim 17, wherein the plate is detached completely from the base along the frangible boundary with the rupture of the frangible barrier.

29. The port assembly of claim 17, wherein the plate is attached to the base with the rupture of the frangible barrier along the frangible boundary.

* * * * *